United States Patent
Rister, Jr. et al.

(10) Patent No.: US 8,093,309 B2
(45) Date of Patent: Jan. 10, 2012

(54) LIGHT COLORED FOAM FOR USE IN MARINE APPLICATIONS

(75) Inventors: Ernest L. Rister, Jr., Round Rock, TX (US); Alan J. Hamilton, Spring, TX (US); Richard R. Romero, Spring, TX (US)

(73) Assignee: Huntsman Petrochemical LLC, The Woodlands, TX (US)

( * ) Notice: Subject to any disclaimer, the term of this patent is extended or adjusted under 35 U.S.C. 154(b) by 187 days.

(21) Appl. No.: 12/374,554

(22) PCT Filed: Jul. 24, 2007

(86) PCT No.: PCT/US2007/074168
§ 371 (c)(1),
(2), (4) Date: Jan. 21, 2009

(87) PCT Pub. No.: WO2008/014227
PCT Pub. Date: Jan. 31, 2008

(65) Prior Publication Data
US 2009/0312446 A1 Dec. 17, 2009

Related U.S. Application Data

(60) Provisional application No. 60/820,175, filed on Jul. 24, 2006.

(51) Int. Cl.
*C08G 18/28* (2006.01)
(52) U.S. Cl. ............ 521/129; 521/109.1; 521/117; 521/128; 521/170; 521/174
(58) Field of Classification Search ........... 521/109.1, 521/117, 128, 129, 170, 174
See application file for complete search history.

(56) References Cited

U.S. PATENT DOCUMENTS

| | | | |
|---|---|---|---|
| 4,529,743 A | 7/1985 | Kollmeier et al. | |
| 4,581,384 A * | 4/1986 | Marion | 521/110 |
| 5,380,768 A | 1/1995 | Cranston et al. | |
| 5,989,715 A | 11/1999 | Kiriazis et al. | |
| 6,534,555 B1 | 3/2003 | Rister, Jr. et al. | |
| 6,668,748 B2 | 12/2003 | Kemp et al. | |
| 6,669,519 B2 | 12/2003 | Metrot | |
| 6,774,153 B2 | 8/2004 | Parfondry et al. | |
| 7,049,265 B2 | 5/2006 | Grigsby, Jr. et al. | |
| 7,202,284 B1 | 4/2007 | Limerkens et al. | |
| 2006/0063447 A1 | 3/2006 | Jolley | |
| 2006/0100295 A1 * | 5/2006 | Heraldo et al. | 521/99 |
| 2008/0125507 A1 * | 5/2008 | Jenny et al. | 521/137 |
| 2009/0292037 A1 * | 11/2009 | Butler et al. | 521/170 |

OTHER PUBLICATIONS

Liz White, "UK Surfers Break Free—Thanks to Local Firm's New Surfboard-Making Process", *Urethanes Technology*, vol. 16, No. 3: Jun./Jul. 1999: p. 26.
Liz White, "Surfboard Technology Moves Into Aerospace-In Missile & Aircraft Wings", *Urethanes Technology*, Jun./Jul. 2002, pp. 28-29.
Liz White, "Clark Team to Make Blanks", *Urethanes Technology*, Apr./May 2006, p. 16.

* cited by examiner

*Primary Examiner* — John Cooney
(74) *Attorney, Agent, or Firm* — Robert A. Diaz

(57) ABSTRACT

A foam includes a white color that is suitable for use in marine flotation devices. The foam includes a methylene diphenyl diisocyanate and polymethylene diphenyl diisocyanate. In some embodiments, the foam also includes a polyol, surfactant, catalyst, and blowing agent.

10 Claims, No Drawings

LIGHT COLORED FOAM FOR USE IN MARINE APPLICATIONS

CROSS-REFERENCE TO RELATED APPLICATIONS

This application is the National Phase of International Application PCT/US2007/074168 filed Jul. 24, 2007 which designated the U.S. and which claims priority to U.S. Provisional App. Ser. No. 60/820,175 filed Jul. 24, 2006. The noted applications are incorporated herein by reference.

BACKGROUND OF THE INVENTION

1. Field of the Invention

This invention relates to the field of foams and more specifically to the field of polyurethane and polyisocyanurate foams.

2. Description of the Related Art

Surfboard and preboard foam have conventionally been manufactured using toluene diisocyanate (TDI) and TDI prepolymers as the isocyanate. Such conventional manufacturing has resulted in worker exposure and environmental issues, which have primarily caused this production to cease.

In addition to safety concerns, polymeric methylene diphenyl diisocyanates such as Rubinate 1850 typically give a tan (e.g., dark brown) foam, which may be unacceptable to surfboard manufacturers. To overcome such typically unwanted colors, the use of other isocyanates has been developed. For instance, other specialty isocyanates (e.g., toluene diisocyanate or aliphatic isocyanates such as hexamethylene diiscyanate or isophorone diisocyanate) may be used to make a white, color-stable foam. Drawbacks to such other isocyanates include that the material may be toxic and expensive. Further drawbacks include that the reaction is extremely slow to form polyurethane and polyisocyanurate foam.

There is a need, therefore, for a method to produce a polyurethane foam in a safe and environmentally acceptable manner. There is also a need for a less expensive method to produce a white, color stable foam.

SUMMARY OF THE INVENTION

It has been discovered that through using methylene diphenyl diisocyanate (MDI), pMDI, or MDI prepolymers or modified MDI such as carbodiimide modified or uretonimine modified MDI, a white polyurethane (PUR)/polyisocyanurate (PIR) foam may be produced. Without being limited by theory, such foam may be acceptable to the surfboard industry. Further, without being limited by theory, such foam may not scorch or discolor during the manufacturing process. Such foam provides a new and safer method of manufacturing products, which may satisfy an existing need.

In one embodiment, a foam includes a polyol, a surfactant, a catalyst, and methylene diphenyl diisocyanate and at least one of a polymethylene diisocyanate or a derivative of methylene diphenyl diisocyanate. In another embodiment, the catalyst is a tertiary amine, a quaternary ammonium salt, or mixtures thereof. In yet another embodiment, the catalyst selected does not produce a malodorous foam. In yet another embodiment, the foam also includes glycerin. In yet another embodiment, the foam further includes a blowing agent. In yet another embodiment, the polyol is derived from reaction products of products of alkylene oxides and simple sugars.

In another embodiment, a method of manufacturing a foam includes providing a reaction mixture containing a polyol, a catalyst, and methylene diphenyl diisocyanate and at least one of a polymethylene diisocyanate or a derivative of methylene diphenyl diisocyanate; mixing the reaction mixture; and forming the foam.

In yet another embodiment, a method of forming a floatation device includes providing a reaction mixture containing a polyol, a catalyst, and methylene diphenyl diisocyanate and at least one of a polymethylene diisocyanate or a derivative of methylene diphenyl diisocyanate; mixing the reaction mixture, thereby forming a foam; shaping the foam to form the floatation device. In one embodiment, the method includes cutting the foam into smaller pieces and wherein the smaller pieces are shaped to form the floatation device. In another embodiment, the floatation device comprises a surfboard. In yet another embodiment, the foam formed is initially in the form of a block and the method includes shaping the block into the form of a surfboard.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION

It has been discovered that the manufacture of white PUR/PIR foam may be accomplished using MDI, pMDI, prepolymers and other isocyanates. Such foam may be used in marine flotation applications (e.g., surfboard and preboard foam). In addition, such foam may be low in color. In one embodiment, foam that is low in color provides a white foam.

In one embodiment, the foam is manufactured using methylene diphenyl diisocyanate and/or modified methylene diphenyl diisocyanate.

In another embodiment, a method of producing a rigid polyurethane foam includes reacting a polyisocyanate composition containing methylene diphenyl diisocyanate and a polyol. In another embodiment, the reaction may include additional components such as a catalyst, a blowing agent, a surfactant, and combinations thereof. In yet another embodiment, the reaction may also include fire retardants, dyes, fillers, heat sinks, ultraviolet stabilizers, and combinations thereof. In yet another embodiment, a method includes providing formulations for rigid polyurethane foam for the manufacture of surfboard foam blanks by the bunstock (e.g., free rise) process using an alternative isocyanate (MDI versus TDI) and a blowing agent or mixture of blowing agents. It must be noted that any other suitable method may be used for manufacturing surf boards, for instance, the molded process may be used.

In one embodiment, the polyisocyanate composition used in the foam manufacturing process may include 4,4'-methylene diphenyl diisocyanate or mixtures of that diisocyanate with one or more other organic polyisocyanates, especially other methylene diphenyl diisocyanate such as the 2,4'-isomer optionally in conjunction with the 2,2'-isomer. The polyisocyanate component may also be an MDI variant derived from a polyisocyanate composition containing at least 95% by weight of 4,4'-methylene diphenyl diisocyanate. MDI variants are well known in the art and may include liquid products obtained by introducing carbodiimide groups into said polyisocyanate composition and/or by reacting with one or more polyols. Preferred polyisocyanate compositions are those containing at least 80% by weight of 4,4'-methylene diphenyl diisocyanate; more preferably, at least 90% by weight; and most preferably, at least 95% by weight. The isocyanate index may be between 105 and 350; more preferably, between 105 and 200; and most preferably, between 105 and 160. The term "isocyanate index" as used herein is the ratio of isocyanate-groups over isocyanate-reactive hydrogen atoms present in a formulation, given as a percentage. In other words, the isocyanate index expresses the percentage of isocyanate actually used in a formulation with respect to the amount of isocyanate theoretically required for reacting with the amount of isocyanate-reactive hydrogen used in a formulation.

In one embodiment, the polyol may be any polyol suitable for reacting with the diisocyanate for forming the foam. In another embodiment, the polyol used may be a mixture of polyols. Suitable polyols include polyether polyols produced from the polymerization of a cyclic oxide such as propylene oxide or ethylene oxide initiated by simple sugars such as sucrose, sorbitol, mannose, lactose, wood sugars, or glycerin. Another exemplary polyol is a polyester polyol, which may be produced from reacting a di- or higher acid with a glycol. Suitable acids or anhydrides are adipic, glutaric, succinic, phthalic, isophthalic, terephthalic acid, and combinations thereof. Suitable glycols are ethylene glycol, diethylene glycol, propylene glycol, dipropylene glycol or higher glycols, 1-4 butane diol, 1-6 hexane diol and the like. Glycerin or trimethanol propane may also be used. A suitable polyol may be selected to control reactivity rates and physical properties of the resulting foam. In embodiments, the foam may be produced using a 50-1,000 OH value polyol.

The polyisocyanate and the polyol may be reacted in the presence of a catalyst. Any catalysts suitable for forming a foam may be used. In an embodiment, suitable catalysts include urethane catalysts. Urethane catalysts are described within *Flexible Urethane Foams*, Herrington, Dow, 1991; *High Polymers*, Volume XVI Polyurethanes part 1 and 2, sanders and Frisch, Interscience Publishers, 1962 and 1964; *Plastics Handbook*, Polyurethanes Volume VII, Hanser-Verlag, Munich and Vienna, First and Second Editions 1966 and 1983, all of which are incorporated herein by reference. In another embodiment, exemplary catalysts include quaternary ammonium hydroxides and quaternary ammonium salts, tertiary amines, metal salts, cross linking agents and chain extenders, low-molecular weight polyamines, polyols, polyepoxides, anhydrides, acids, i.e. low-molecular weight multifunctional materials containing more than one active hydrogen, and combinations thereof. In particular, glycerin may be used from 0 to 30 parts pbw to increase the hardness or modulus of the foams. Exemplary quaternary ammonium catalysts include N-methyl(diethanol)amine quaternary ammonium formate, which is a compound in JEFFCAT® TR-63. Exemplary tertiary amine catalysts include N,N,N', N',N"-pentamethyldipropylene triamine, which is a compound found in JEFFCAT® ZR-40.

In another embodiment, a blowing agent may be added to the reaction system containing the diisocyanate and the polyol. Exemplary blowing agents include water, liquid carbon dioxide, hydrochlorofluorocarbon such as R-22, HCFC 141b, hydrofluorocarbons (HFC's) such as HFC 245fa, 134a, other known blowing agents such as 2-chloropropanol, organic acids and anhydrides, and mixtures of blowing agents. Other suitable blowing agents include chemicals that form a gas during the foaming process either from chemical reactions or from a physical change of state to a gas during the foaming reaction. In one embodiment, water as the blowing agent may be present in an amount between 0.1 parts by weight and 4.0 parts by weight per 100 parts by weight of polyol.

In one embodiment, the foam may be made by combining "Part A" and "Part B" formulation subcombinations with each other at ambient temperature and pressure, with sufficient agitation, wherein Part A includes the diisocyanate component, and wherein Part B includes the remaining components. In one example, Part B may include an organic polyol and optionally, a catalyst, a blowing agent, or other components suitable for inclusion in polyurethanes or polyurethane foams, such as plasticizers, surfactants, other catalysts, colorants, dyes, water, etc. In another embodiment, one or more of the components in Part B may be kept in one or more streams separate from Part B before mixing with the diisocyanate. For example, the blowing agent may be kept in separate stream before mixing with Part A and Part B. The foam may be made by placing all of the reactants (e.g., diisocyanate, polyol, and blowing agent) of a given formulation in a container and mixed using a high shear mechanical mixer. The reactants are preferably mixed at any temperature at which the mixture is in a liquid state, preferably between 15° C. and 170° C., more preferably, between 15° C. and 100° C. Generally, stirring is desired to promote formation of a plurality of small particles. Thereafter, the mixture may be poured into another container and allowed to rise and cure.

In one embodiment, the foam may be produced at room temperature. However, any temperature range suitable for preparing the foam may be used. For instance, one of ordinary skill in the art may select a suitable temperature when provided the proper catalyst loading. In an embodiment, suitable temperatures may range from about 50° F. to about 200° F., more preferably, from about 60° F. to about 120° F.

Any pressure range suitable to prepare a foam may be used. For instance, suitable pressures may range from about −20 mmHg to about 1,520 mmHg, more preferably, from about 740-780 mmHg (1 atm=760 mmHg).

Rigid foam manufactured according to embodiments of the present invention may have a density between 2.0 and 5.0 pounds per cubic foot, and the percentage of closed cells is at least 75%, preferably, at least 85%. The foam may also have a surface friability of less than 8%, preferably, less than 5%, and a compressive strength greater than 15 pounds per square inches, preferably, greater than 22 pounds per square inches. Further, the foam may have a humid aged dimensional stability percentage change of less than 10%, preferably, less than 6%, and water absorption less than 3%, preferably, less than 1%.

The foam formulation may be suitable for water flotation devices (e.g., marine floatation devices). For instance, such devices may include surfboards. In embodiments, the foam may be white and surprisingly does not scorch, is not malodorous, and remains stable during the foaming process.

In one embodiment, the reaction mixture may be poured into a container. After the reaction is completed, the resulting foam may be shaped into the form of the floatation device. In another embodiment, because the resulting foam has a white or substantially white interior, the resulting foam may be cut into blocks, wherein each block may then be shaped to produce the foam blanks for a floatation device, for example, a surfboard.

To further illustrate various illustrative embodiments of the present invention, the following examples are provided.

EXAMPLES

Example 1

A formulation was prepared having the following composition in parts by weight ("pbw"): STEPANPOL® PS2352 polyol (100 pbw), SILBYK® 3801 surfactant (2 pbw), water (0.5 pbw), pentane (16 pbw), JEFFCAT® TR-90 catalyst (1.76 pbw), and RUBINATE® 1850 isocyanate (237.56 pbw). The isocyanate index is 300. STEPANPOL® PS2352 is a polyester polyol based on phthalic anhydride and diethylene glycol and is commercially available from Stepan Company. SILBYK® 3801 is a silicone surfactant commercially available form BYK-Chemie. JEFFCAT®TR-90 is a tris-dimethylaminoproyl-S-Triazine which is a tertiary amine urethane catalyst commercially available from Huntsman Corporation. RUBINATE® 1850 is a PMDI isocyanate commercially available from Huntsman Corporation. The pentane blend is a 70:30 blend of normal pentane and 2-methylbutane (isopentane).

Reactivity conditions of the formulation include a cream time of 60 seconds, a top of cup of 300 seconds, and gel time of 360 seconds.

Results include that the foam exhibited all the acceptable properties but was high in color (e.g., too brown).

Example 2

A formulation was prepared having the following composition in parts by weight: JEFFOL® S-490 polyol (85 pbw), glycerin (15 pbw), SILBYK® 3805 surfactant (2 pbw), JEFFCAT® TR-90 catalyst (0.5 pbw), JEFFCAT® TR-63 catalyst (2 pbw), water (0.5 pbw), pentane blend (16 pbw), and RUBINATE® 1790 isocyanate (352.37 pbw). The isocyanate index is 150. JEFFOL®S-490 is a polyol produced from the reaction of propylene oxide and sorbitol commercially available from Huntsman Corporation. Rubinate® 1790 is an MDI prepolymer formed from an aliphatic polyester polyol and MDI. SILBYK® 3805 is a silicone surfactant commercially available form BYK-Chemie. JEFFCAT®TR-63 is a quaternary ammonium hydroxide salt catalyst commercially available from Huntsman Corporation.

Reactivity conditions of the formulation include a cream time of 120 seconds, top of cup 410 seconds and rise time of 460 seconds.

Results include a 2.75 pcf white foam with a good formulation for molding due to long cream time and slow rise time.

Example 3

A formulation was prepared having the following composition in parts by weight: STEPANPOL® PS2352 polyol (50 pbw), JEFFOL® S-490 polyol (50 pbw), SILBYK® 3801 surfactant (2 pbw), DABCO® TMR-3 catalyst (2.41 pbw), JEFFCAT® TR-52 catalyst (1.20 pbw), JEFFCAT® PMDETA (pentamethydiethylenetriamine) catalyst (0.19 pbw), water (0.24 pbw), pentane blend (16 pbw), and RUBINATE® 1790 isocyanate (239 pbw). The isocyanate index is 180. DABCO® TMR-3 is a trimethyaminohydroxypropyl quaternary ammonium formate catalyst commercially available from Air Products. JEFFCAT® PMDETA is a tertiary amine catalyst commercially available from Huntsman Corporation. JEFFCAT® TR-52 is an amine catalyst commercially available from Huntsman Corporation.

Reactivity conditions of the formulation include a cream time of 26 seconds, a top of cup of 66 seconds, a string-gel of 76 seconds, a tack free of 92 seconds, and an end of rise of 153 seconds.

Results include a 2.2 pcf off-white foam with yellowing in the center and evidence of scorching. The foam had too much color and was high in fishy or amine like odor.

Example 4

A formulation was prepared having the following composition in parts by weight: STEPANPOL® PS2352 polyol (50 pbw), JEFFOL® S-490 polyol (50 pbw), SILBYK® 3801 surfactant (2 pbw), Rebus® 3801 (pigment dispersion of titanium dioxide ($TiO_2$) in polyester polyol supplied by Rebus Chemical) (10.00 pbw), DABCO® TMR-3 catalyst (2.41 pbw), JEFFCAT® TR-52 catalyst (1.20 pbw), JEFFCAT® PMDETA catalyst (0.19 pbw), water (0.24 pbw), pentane blend (16 pbw), and RUBINATE® 1790 isocyanate (239 pbw). The isocyanate index is 180.

Reactivity conditions of the formulation include a cream of 29 seconds, a top of cup of 69 seconds, a string-gel of 84 seconds, a tack free of 84 seconds, and an end of rise of 102 seconds.

Results included a 2.2 pcf foam with high discoloration or yellowing in the center, which was not acceptable. The foam was unacceptably high in amine odor.

Example 5

A formulation was prepared having the following composition in parts by weight: JEFFOL® G30-240 polyol (100 pbw), SILBYK® 3801 surfactant (2 pbw), Huntsman titanium dioxide pigment (Tioxide® TR-90) (5 pbw), DABCO® TMR-3 catalyst (2.41 pbw), JEFFCAT® TR-52 catalyst (1.20 pbw), JEFFCAT® PMDETA catalyst (0.19 pbw), water (0.24 pbw), pentane blend (16 pbw), and RUBINATE® 1790 isocyanate (239 pbw). The isocyanate index is 180. Tioxide® TR-90 is a $TiO_2$ powder pigment commercially available from Huntsman. JEFFOL® G30-240 is a polyether diol commercially available from Huntsman.

Reactivity conditions of the formulation include a cream of 36 seconds, a top of cup of 140 seconds, a string-gel of 198 seconds, and a tack free of 316 seconds.

Results include a 2.3 pcf that had acceptably white foam but was high in amine odor.

Example 6

A formulation was prepared having the following composition in parts by weight: STEPANPOL® PS2352 polyol (50 pbw), JEFFOL® S-490 polyol (25 pbw), JEFFOL® G30-240 polyol (25 pbw), SILBYK® 3801 surfactant (2 pbw), JEFFCAT® TR-63 catalysts (3.00 pbw), JEFFCAT® ZR-40 catalyst (0.20 pbw), water (0.24 pbw), pentane blend (16 pbw), and RUBINATE® 1790 isocyanate (160 pbw). The isocyanate index is 145. JEFFCAT® ZR40 is a tertiary amine catalyst commercially available from Huntsman Corporation.

Reactivity conditions of the formulation include a cream of 24 seconds, a top of cup of 49 seconds, a string-gel 60 seconds, a tack free of 90 seconds, and an end of rise of 130 seconds.

Results include a 2.4 pcf that was acceptable white foam with no amine odor.

Example 7

A formulation was prepared having the following composition in parts by weight: JEFFOL® S-490 polyol (50 pbw), JEFFOL® G30-240 polyol (50 pbw), SILBYK® 3801 surfactant (2 pbw), JEFFCAT® TR-63 catalyst (3.00 pbw), JEF- FCAT® ZR-40 catalyst (0.20 pbw), water (0.24 pbw), pentane blend (10 pbw), and RUBINATE® 1790 isocyanate (200 pbw). The isocyanate index is 152.

Reactivity conditions of the formulation include a cream time of 24 seconds, a top of cup of 55 seconds, a string-gel of 62 seconds, a tack free of 80 seconds, and an end of rise 130 seconds.

Example 8

A formulation was prepared having the following composition in parts by weight. JEFFOL®S-490 polyol (50 pbw), JEFFOL® G30-240 polyol (50 pbw), SILBYK 3805 silicone surfactant (2.0 pbw), water (0.25 pbw), JEFFCAT®TR-63 (1.0 pbw), JEFFCAT®ZR-40 (2.0 pbw), diethylene glycol (0.5 pbw), pentane blend (9.0 pbw), and Rubinate®1790 isocyanate (203 pbw). The isocyanate index is 153.

Reactivity conditions of the formulation include a cream time of 22 seconds, top of cup time 58 seconds, a string gel time of 65 seconds, a tack free time of 73 seconds and rise time of 110 seconds.

Results include acceptably white foam with no amine odor. The typical physical properties of the foams are shown in Table 1 below:

TABLE I

Foam Physical Properies

| Property | ID# 8514-020-B |
|---|---|
| Density, pcf | 2.95 |
| Friabilty, % weight loss | 0.42 |
| Cell size, mm | |
| Para | 0.3693 |
| Perp | 0.3245 |
| Z-average Diameter | 0.3386 |
| Closed Cell, % | 89.60 |
| Flexural Strength, Stress @ 5% strain | 52 |
| Modulus psi | 1162 |
| Compressive strength, psi | |
| Dir 1 | 23.00 |
| Dir 2 | 37.30 |
| Dir 3 | 34.43 |
| Break stress (tensile) psi | 44 |
| Water absorption, % | 0.49 |
| DimStab −40/amb % RH 7 days | |
| Length % | −0.1 |
| Width % | −0.1 |
| Thickness % | −0.1 |
| Volume % | −1.2 |
| Weight % | 0.2 |
| Dim Stab 70 C/97% RH 7 days | |
| Length % | 3.8 |
| Width % | 0.1 |
| Thickness % | 1.8 |
| Volume % | 5.6 |
| Weight % | 0.9 |
| Dim Stab 93 C/Amb RH 7 days | |
| Length % | −0.4 |
| Width % | −0.5 |
| Thickness % | 0.8 |
| Volume % | −0.1 |
| Weight % | −0.2 |

Although embodiments of the present invention and their advantages have been described in detail, it should be understood that various changes, substitutions and alterations may be made herein without departing from the spirit and scope of the invention as defined by the appended claims.

What is claimed is:

1. A foam comprising:
a polyether polyol produced from the polymerization of a cyclic oxide and a sugar, a surfactant, a catalyst, and methylene diphenyl diisocyanate and at least one of a polymethylene diphenyl diisocyanate or a derivative of methylene diphenyl diisocyanate and wherein the catalyst comprises N-methyl(diethanol)amine quaternary ammonium formate and the foam comprises a white color; and wherein the cyclic oxide comprises propylene oxide or ethylene oxide and the sugar is selected from the group consisting of sucrose, sorbitol, mannose, lactose, wood sugar or glycerin.

2. The foam of claim 1, wherein the catalyst further comprises a tertiary amine.

3. The foam of claim 1, further comprising glycerin.

4. The foam of claim 1, further comprising a blowing agent.

5. A method of manufacturing a foam, comprising:
providing a reaction mixture containing a polyether polyol produced from the polymerization of a cyclic oxide and a sugar, a surfactant, a catalyst, and methylene diphenyl diisocyanate and at least one of a polymethylene diphenyl diisocyanate or a derivative of methylene diphenyl diisocyanate and wherein the catalyst comprises N-methyl(diethanol)amine quaternary ammonium formate;
mixing the reaction mixture; and
foaming the foam and wherein the foam comprises a white color; and wherein the cyclic oxide comprises propylene oxide or ethylene oxide and the sugar is selected from the group consisting of sucrose, sorbitol, mannose, lactose, wood sugar or glycerin.

6. The method of claim 5, wherein the catalyst further comprises a tertiary amine.

7. The method of claim 5, wherein the reaction mixture further comprises a glycerine present in an amount up to 30 pbw.

8. The method of claim 5, wherein the reaction mixture further comprises a blowing agent.

9. A method of forming a flotation device, comprising:
providing a reaction mixture containing a polyether polyol produced from the polymerization of a cyclic oxide and a sugar, a surfactant, a catalyst, and methylene diphenyl diisocyanate and at least one of a polymethylene diphenyl diisocyanate or a derivative of methylene diphenyl diisocyanate and wherein the catalyst comprises N-methyl(diethanol)amine quaternary ammonium formate;
mixing the reaction mixture thereby forming foam; and
shaping the foam to form the flotation device; wherein the foam comprises a white color; and wherein the cyclic oxide comprises propylene oxide or ethylene oxide and the sugar is selected from the group consisting of sucrose, sorbitol, mannose, lactose, wood sugar or glycerin.

10. The method of claim 9, further comprising cutting the foam into smaller pieces and wherein the smaller pieces are shaped to form the flotation device.

* * * * *